United States Patent [19]

Fishback

[11] Patent Number: 5,705,823

[45] Date of Patent: Jan. 6, 1998

[54] POLYOL COMPOSITIONS CONTAINING HIGH LEVELS OF SILICONE-CONTAINING SURFACTANT POLYMER TO IMPROVE FLAME RETARDANCE AND AGED K-FACTORS OF POLYURETHANE FOAMS

[75] Inventor: Thomas L. Fishback, Gibraltar, Mich.

[73] Assignee: BASF Corporation, Mt. Olive, N.J.

[21] Appl. No.: 549,584

[22] Filed: Oct. 27, 1995

[51] Int. Cl.$^6$ .................................................. C08K 3/00
[52] U.S. Cl. ........................ 252/182.27; 252/182.28; 521/112; 521/172; 556/439; 556/440; 556/445; 556/449
[58] Field of Search .................................. 556/439, 440, 556/445, 449; 521/112, 172; 252/182.27, 182.28

[56] References Cited

U.S. PATENT DOCUMENTS

| | | | |
|---|---|---|---|
| 4,146,498 | 3/1979 | Sandner et al. | 521/121 |
| 4,588,755 | 5/1986 | Kollmeier et al. | 521/112 |
| 4,751,251 | 6/1988 | Thomsberry | 521/112 |
| 5,093,376 | 3/1992 | Möhring et al. | 521/112 |
| 5,492,939 | 2/1996 | Stanga et al. | 521/112 |

*Primary Examiner*—Morton Foelak
*Attorney, Agent, or Firm*—Fernando A. Borrego

[57] ABSTRACT

There is now provided a polyol composition containing a polyol having polyester linkages and a number average molecular weight of 400 or more, and at least about 8 php of a silicone-containing surfactant polymer. Either mixed into the polyol composition at the time of foaming, mixed into an isocyanate, or both, is an aliphatic or cycloaliphatic $C_4$–$C_7$ hydrocarbon. The polyol composition is used to make a polyisocyanate based closed cell rigid foam by reacting an organic isocyanate and the polyol composition in the presence of an aliphatic or cycloaliphatic $C_4$–$C_7$ hydrocarbon blowing agent.

21 Claims, No Drawings

POLYOL COMPOSITIONS CONTAINING HIGH LEVELS OF SILICONE-CONTAINING SURFACTANT POLYMER TO IMPROVE FLAME RETARDANCE AND AGED K-FACTORS OF POLYURETHANE FOAMS

1. FIELD OF THE INVENTION

The present invention relates to rigid closed cell polyisocyanate based foams and methods of making the foams, and to the polyol compositions used to make such foams. In particular, the present invention relates to polyol compositions which contain a polyol having polyester linkages and at least about 8 php of a silicone-containing surfactant polymer, along with an aliphatic or cycloaliphatic $C_4$–$C_7$ hydrocarbon blowing agent mixed into the polyol composition and/or into the isocyanate, and to the flame retarded and low aged k-factor foams made thereby.

2. BACKGROUND OF THE INVENTION

Recently, $C_4$–$C_7$ hydrocarbon blowing agents have gained increasing importance as zero ozone depletion potential alternative blowing agents for polyurethane foams. One problem associated with hydrocarbons per se is their flammability and their relatively poor insulation factors compared to CFC-11. Efforts have been underway to make hydrocarbon blown polyurethane foams having good k-factors and as flame resistant as possible, without sacrificing the mechanical properties of the foam. It would be desirable to improve the flammability of a hydrocarbon blown foam using inexpensive and currently widely commercially available ingredients. It would also be desirable that such ingredient(s) does not require addition of further isocyanate to retain the same isocyanate index, thereby further adding to the cost of the foam. Furthermore, such an ingredient should not degrade the physical properties of the foam, such as the k-factor, compressive strength, and friability.

3. SUMMARY OF THE INVENTION

There is now provided a polyol composition containing a polyol having polyester linkages and a number average molecular weight of 400 or more, and at least about 8 php of a silicone-containing surfactant polymer. Either mixed into the polyol composition at the time of foaming, mixed into an isocyanate, or both, is an aliphatic or cycloaliphatic $C_4$–$C_7$ hydrocarbon. There is also provided a polyisocyanate based closed cell rigid foam and method for making such by reacting an organic isocyanate and the polyol composition in the presence of an aliphatic or cycloaliphatic $C_4$–$C_7$ hydrocarbon blowing agent.

The high levels of silicone-containing surfactant surprisingly led not only to an improvement in flammability resistance as measured by the Butler Chimney test, but also improved, rather than retained at status quo, the other mechanical properties of the foam, such as the aged k-factors and thermal insulation loss over a 30 day period, the compression strength and friability. No significant improvement in any of these properties was noticed when the amount of surfactant polymer was used at the conventional levels of about 2 php or above, until about 8 php of the silicone surfactant polymer was added. Furthermore, the silicone-containing polymers are widely commercially available, and many of them are non-reactive with the isocyanate so no additional costs are added to the foam through additional isocyanate use.

4. DETAILED DESCRIPTION OF THE INVENTION

As the first ingredient in the polyol composition, there is provided an a) polyol having polyester linkages. Preferably, the total amount of polyols in the polyol composition having number average molecular weights of 400 or more have an average functionality of 1.8 to 8, more preferably 3 to 6, and an average hydroxyl number of 150 to 850, more preferably 350 to 800. Polyols having hydroxyl numbers and functionalities outside this range may be used so long as the average hydroxyl number for the total amount of polyols used fall within the aforementioned ranges.

Other types of polyols may be used in combination with the polyol having polyester linkages. Examples of polyols are thioether polyols, polyester amides and polyacetals containing hydroxyl groups, aliphatic polycarbonates containing hydroxyl groups, amine terminated polyoxyalkylene polyethers, polyoxyalkylene polyether polyols, and graft dispersion polyols. Mixtures of at least two of these polyols can be used so long as a polyol having polyester linkages is present in the polyol composition in the aforesaid range.

The terms "polyol having polyester linkages" and "polyester polyol" as used in this specification and claims include any minor amounts of unreacted polyol remaining after the preparation of the polyester polyol and/or unesterified low molecular weight polyols (e.g., glycol) added after the preparation of the polyester polyol. The polyester polyol can include up to about 40 weight percent free glycol.

Polyols having polyester linkages broadly include any polyol having two or more ester linkages in the compound, such as the conventional polyester polyols and the polyester-polyether polyols.

The polyester polyols advantageously have an average functionality of about 1.8 to 8, preferably about 1.8 to 5, and more preferably about 2 to 3. The commercial polyester polyols used generally have average hydroxyl numbers within a range of about 15 to 750, preferably about 30 to 550, and more preferably about 150 to 500 (taking into account the free glycols that may be present), and their free glycol content generally is from about 0 to 40 weight percent, and usually from 2 to 15 weight percent, of the total polyester polyol component. In calculating the average functionality and hydroxyl number of the total amount of polyols used in the polyol composition, the presence of the free glycols is not taken into account because the glycols have number average molecular weights of less than 400.

Suitable polyester polyols can be produced, for example, from organic dicarboxylic acids with 2 to 12 carbons, preferably aliphatic dicarboxylic acids with 4 to 6 carbons and aromatic bound dicarboxylic acids, and multivalent alcohols, preferably diols, with 2 to 12 carbons, preferably 2 to 6 carbons. Examples of dicarboxylic acids include succinic acid, glutaric acid, adipic acid, suberic acid, azelaic acid, sebacic acid, decanedicarboxylic acid, maleic acid, fumaric acid, phthalic acid, isophthalic acid, and terephthalic acid. The dicarboxylic acids can be used individually or in mixtures. Instead of the free dicarboxylic acids, the corresponding dicarboxylic acid derivatives may also be used such as dicarboxylic acid mono- or di- esters of alcohols with 1 to 4 carbons, or dicarboxylic acid anhydrides. Dicarboxylic acid mixtures of succinic acid, glutaric acid and adipic acid in quantity ratios of 20–35:35–50:20–32 parts by weight are preferred, as well as terephthalic acid and isophthalic acid and their 1–4 carbon ester derivatives. Examples of divalent and multivalent alcohols, especially diols, include ethanediol, diethylene glycol, 1,2- and 1,3-propanediol, dipropylene glycol, 1,4-butanediol, 1,5-pentanediol, 1,6-hexanediol, 1,10-decanediol, glycerine and trimethylolpropanes, tripropylene glycol, tetraethylene glycol, tetrapropylene glycol, tetramethylene glycol, 1,4- cyclohexane-dimethanol, ethanediol, diethylene glycol, 1,4-butanediol, 1,5-pentanediol, 1,6-hexanediol, or mixtures of at least two of these diols are preferred, especially mixtures of 1,4-butanediol, 1,5-pentanediol, and 1,6-hexanediol. Furthermore, polyester polyols of lactones, e.g., ε-caprolactone or hydroxycarboxylic acids, e.g., ω-hydroxycaproic acid, may also be used.

The polyester polyols can be produced by polycondensation of organic polycarboxylic acids, e.g., aromatic or aliphatic polycarboxylic acids and/or derivatives thereof and multivalent alcohols in the absence of catalysts or preferably in the presence of esterification catalysts, generally in an atmosphere of inert gases, e.g., nitrogen, carbon dioxide, helium, argon, etc., in the melt at temperatures of 150° to 250° C., preferably 180° to 220° C., optionally under reduced pressure, up to the desired acid value which is preferably less than 10, especially less than 2. In a preferred embodiment, the esterification mixture is subjected to polycondensation at the temperatures mentioned above up to an acid value of 80 to 30, preferably 40 to 30, under normal pressure, and then under a pressure of less than 500 mbar, preferably 50 to 150 mbar. The reaction can be carried out as a batch process or continuously. When present, excess glycol can be distilled from the reaction mixture during and/or after the reaction, such as in the preparation of low free glycol-containing polyester polyols usable in the present invention. Examples of suitable esterification catalysts include iron, cadmium, cobalt, lead, zinc, antimony, magnesium, titanium and tin catalysts in the form of metals, metal oxides or metal salts. However, the polycondensation may also be preformed in liquid phase in the presence of diluents and/or chlorobenzene for aziotropic distillation of the water of condensation.

To produce the polyester polyols, the organic polycarboxylic acids and/or derivatives thereof and multivalent alcohols are preferably polycondensed in a mole ratio of 1:1–1.8, more preferably 1:1.05–1.2.

After transesterification or esterification, the reaction product can be reacted with an alkylene oxide to form a polyester-polyether polyol mixture. This reaction desirably is catalyzed. The temperature of this process should be from about 80° to 170° C., and the pressure should generally range from about 1 to 40 atmospheres. While the aromatic polyester polyols can be prepared from substantially pure reactant materials, more complex ingredients are advantageously used, such as the side stream, waste or scrap residues from the manufacture of phthalic acid, terephthalic acid, dimethyl terephthalate, polyethylene terephthalate, and the like. Particularly suitable compositions containing phthalic acid residues for use in the invention are (a) ester-containing byproducts from the manufacture of dimethyl terephthalate, (b) scrap polyalkylene terephthalates, (c) phthalic anhydride, (d) residues from the manufacture of phthalic acid or phthalic anhydride, (e) terephthalic acid, (f) residues from the manufacture of terephthalic acid, (g) isophthalic acid, (h) trimellitic anhydride, and (i) combinations thereof. These compositions may be converted by reaction with the polyols of the invention to polyester polyols through conventional transesterification or esterification procedures.

Polyester polyols whose acid component advantageously comprises at least about 30 percent by weight of phthalic acid residues are useful. By phthalic acid residue is meant the group:

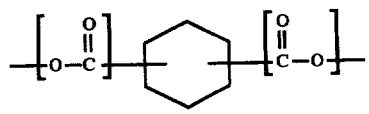

A preferred polycarboxylic acid component for use in the preparation of the aromatic polyester polyols is phthalic anhydride. This component can be replaced by phthalic acid or a phthalic anhydride bottoms composition, a phthalic anhydride crude composition, or a phthalic anhydride light ends composition, as such compositions are defined in U.S. Pat. No. 4,529,744.

Other preferred materials containing phthalic acid residues are polyalkylene terephthalates, especially polyethylene terephthalate (PET), residues or scraps.

Still other preferred residues are DMT process residues, which are waste or scrap residues from the manufacture of dimethyl terephthalate (DMT). The term "DMT process residue" refers to the purged residue which is obtained during the manufacture of DMT in which p-xylene is converted through oxidation and esterification with methanol to the desired product in a reaction mixture along with a complex mixture of byproducts. The desired DMT and the volatile methyl p-toluate byproduct are removed from the reaction mixture by distillation leaving a residue. The DMT and methyl p-toluate are separated, the DMT is recovered and methyl p-toluate is recycled for oxidation. The residue which remains can be directly purged from the process or a portion of the residue can be recycled for oxidation and the remainder diverted from the process or, if desired, the residue can be processed further as, for example, by distillation, heat treatment and/or methanolysis to recover useful constituents which might otherwise be lost, prior to purging the residue from the system. The residue which is finally purged from the process, either with or without additional processing, is herein called DMT process residue.

These DMT process residues may contain DMT, substituted benzenes, polycarbomethoxy diphenyls, benzyl esters of the toluate family, dicarbomethoxy fluorenone, carbomethoxy benzocoumarins and carbomethoxy polyphenols. Cape Industries, Inc. sells DMT process residues under the trademark Terate® 101. DMT process residues having a different composition but still containing the aromatic esters and acids are also sold by DuPont and others. The DMT process residues to be transesterified in accordance with the present invention preferably have a functionality at least slightly greater than 2. Such suitable residues include those disclosed in U.S. Pat. Nos. 3,647,759; 4,411,949; 4,714,717; and 4,897,429; the disclosures of which with respect to the residues are hereby incorporated by reference.

Examples of suitable polyester polyols are those derived from PET scrap and available under the designation Chardol 170, 336A, 560, 570, 571 and 572 from Chardonol and Freol 30–2150 from Freeman Chemical. Examples of suitable DMT derived polyester polyols are Terate® 202, 203, 204, 254, 2541, and 254A polyols, which are available from Cape Industries. Phthalic anhydride derived polyester polyols are commercially available under the designation Pluracol® polyol 9118 from BASF Corporation, and Stepanol PS-2002, PS-2402, PS-2502A, PS-2502, PS-2522, PS-2852, PS-2852E, PS-2552, and PS-3152 from Stepan Company.

Polyoxyalkylene polyether polyols, which can be obtained by known methods, can be mixed with the polyol having polyester linkages. For example, polyether polyols can be produced by anionic polymerization with alkali hydroxides such as sodium hydroxide or potassium hydroxide or alkali alcoholates, such as sodium methylate, sodium ethylate, or potassium ethylate or potassium isopropylate as catalysts and with the addition of at least one initiator molecule containing 2 to 8, preferably 3 to 8, reactive hydrogens or by cationic polymerization with Lewis acids such as antimony pentachloride, boron trifluoride etherate, etc., or bleaching earth as catalysts from one or more alkylene oxides with 2 to 4 carbons in the alkylene radical. Any suitable alkylene oxide may be used such as 1,3-propylene oxide, 1,2- and 2,3-butylene oxide, amylene oxides, styrene oxide, and preferably ethylene oxide and 1,2-propylene oxide and mixtures of these oxides. The polyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyalkylene polyether polyols may have either primary or secondary hydroxyl groups.

Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-tetramethylene and polyoxyethylene glycols, and copolymer glycols prepared from blends or sequential addition of two or more alkylene oxides. The polyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459.

Polyethers which are preferred include the alkylene oxide addition products of polyhydric alcohols such as ethylene glycol, propylene glycol, dipropylene glycol, trimethylene glycol, 1,2-butanediol, 1,5-pentanediol, 1,6-hexanediol, 1,7-heptanediol, hydroquinone, resorcinol glycerol, glycerine, 1,1,1-trimethylol-propane, 1,1,1-trimethylolethane, pentaerythritol, 1,2,6-hexanetriol, α-methyl glucoside, sucrose, and sorbitol. Also included within the term "polyhydric alcohol" are compounds derived from phenol such as 2,2-bis(4-hydroxyphenyl)-propane, commonly known as Bisphenol A.

Suitable organic amine starting materials include aliphatic and cycloaliphatic amines and mixtures thereof, having at least one primary amino group, preferably two or more primary amino groups, and most preferable are the diamines. Specific non-limiting examples of aliphatic amines include monoamines having 1 to 12, preferably 1 to 6 carbon atoms, such as methylamine, ethylamine, butylamine, hexylamine, octylamine, decylamine and dodecylamine; aliphatic diamines such as 1,2-diaminoethane, propylene diamine, 1,4-diaminobutane, 1,6-diaminohexane, 2,2-dimethyl-,3-propanediamine, 2-methyl-1,5-pentadiamine, 2,5-dimethyl-2,5-hexanediamine, and 4-aminomethyloctane-1,8-diamine, and amino acid-based polyamines such as lysine methyl ester, lysine aminoethyl ester and cystine dimethyl ester; cycloaliphatic monoamines of 5 to 12, preferably of 5 to 8, carbon atoms in the cycloalkyl radical, such as cyclohexylamine and cyclo-octylamine and preferably cycloaliphatic diamines of 6 to 13 carbon atoms, such as cyclohexylenediamine, 4,4'-, 4,2'-, and 2,2'-diaminocyclohexylmethane and mixtures thereof; aromatic monoamines of 6 to 18 carbon atoms, such as aniline, benzylamine, toluidine and naphthylamine and preferably aromatic diamines of 6 to 15 carbon atoms, such as phenylenediamine, naphthylenediamine, fluorenediamine, diphenyldiamine, anthracenediamine, and preferably 2,4- and 2,6-toluenediamine and 4,4'-, 2,4'-, and 2,2'-diaminodiphenylmethane, and aromatic polyamines such as 2,4,6-triaminotoluene, mixtures of polyphenyl-polymethylene-polyamines, and mixtures of diaminidiphenylmethanes and polyphenyl-polymethylene-polyamines. Preferred are ethylenediamine, propylenediamine, decanediamine, 4,4'-diaminophenylmethane, 4,4'-diaminocyclohexylmethane, and toluenediamine.

Suitable initiator molecules also include alkanolamines such as ethanolamine, diethanolamine, N-methyl- and N-ethylethanolamine, N-methyl- and N-ethyldiethanolamine and triethanolamine plus ammonia.

Suitable polyhydric polythioethers which may be condensed with alkylene oxides include the condensation product of thiodiglycol or the reaction product of a dicarboxylic acid such as is disclosed above for the preparation of the polyester polyols with any other suitable thioether glycol.

The polyester polyol may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the polyester polyol with only a portion of the components being a diamine such as ethylene diamine.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two —SH groups such as 1,2-ethanedithiol, 1,2-propanedithiol, 1,2-propanedithiol, and 1,6-hexanedithiol; alkene thiols such as 2-butene-1,4-dithiol; and alkyne thiols such as 3-hexyne-1,6-dithiol.

Also suitable for mixture with the compound having polyester linkages are polymer modified polyols, in particular, the so-called graft polyols. Graft polyols are well known to the art and are prepared by the in situ polymerization of one or more vinyl monomers, preferably acrylonitrile and styrene, in the presence of a polyether or polyester polyol, particularly polyols containing a minor amount of natural or induced unsaturation. Methods of preparing such graft polyols may be found in columns 1–5 and in the Examples of U.S. Pat. No. 3,652,639; in columns 1–6 and the Examples of U.S. Pat. No. 3,823,201; particularly in columns 2–8 and the Examples of U.S. Pat. No. 4,690,956; and in U.S. Pat. No. 4,524,157; all of which patents are herein incorporated by reference.

Non-graft polymer modified polyols can also be mixed with, for example, those prepared by the reaction of a polyisocyanate with an alkanolamine in the presence of a polyol as taught by U.S. Pat. Nos. 4,293,470; 4,296,213; and 4,374,209; dispersions of polyisocyanurates containing pendant urea groups as taught by U.S. Pat. No. 4,386,167; and polyisocyanurate dispersions also containing biuret linkages as taught by U.S. Pat. No. 4,359,541. Other polymer modified polyols may be prepared by the in situ size reduction of polymers until the particle size is less than 20 μm, preferably less than 10 μm.

The polyol composition, in addition to the polyol having polyester linkages, may also contain any of the above mentioned polyols such as polyether polyols, as well as an organo-phosphorus compounds having at least two isocyanate reactive hydrogens. The organo-phosphorus compounds having at least two isocyanate active hydrogens are reactive with the isocyanate to form part of the polyurethane matrix, thereby promoting good char formation without collapse of the charred surface into fresh foam which can burn. The foams contain phosphorus atoms covalently bonded through one or more carbon atoms and/or oxygen atoms to a urethane group, thereby forming a part of the foam matrix. The reactive organo-phosphorus compound used in the invention may be distinguished from organo=phosphorus additives which are non-reactive with an isocyanate group because the latter do not form a part of the polyurethane matrix through covalent bonding to a urethane group.

These organo-phosphorus compounds have at least two isocyanate reactive hydrogens such as thio groups, amino groups, hydroxyl groups, or mixtures thereof. Preferred are the organo-phosphorus polyols. Illustrative organo-phosphorus polyols which may be employed in the polyol composition of the present invention include phosphate polyols, phosphite polyols, phosphonate polyols, phosphinate polyols, phosphoramidates, polyphosphorus polyols, phosphinyl polyether polyols, and polyhydroxyl-containing phosphine oxides.

Typical phosphate polyols are those prepared (1) by the reaction of alkylene oxides with (a) phosphoric acids having a $P_2O_5$ equivalency of from 72 to 95 percent, (b) partial esters of these acids, or (c) esters prepared by the reaction of phosphorus pentoxide and alcohols; (2) by the oxidation of phosphites prepared by the reaction of trialkyl phosphites with polyhydroxyl-containing materials; and (3) by transesterifying the reaction products of (1) and (2). The preparation of these neutral phosphate polyols is known in the art as evidence by U.S. Pat. Nos. 3,375,305; 3,369,060; 3,324,202; 3,317,639; 3,317,510; 3,099,676; 3,081,331; 3,061,625; 2,909,559; 3,417,164; and 3,393,254.

Also useful are the phosphite polyols, which are meant to also include the diphosphites and the polyphosphite polyol compounds, optionally containing polyphosphates. Typical phosphite polyols are those prepared (1) by the reaction of alkylene oxides with phosphorus acid, (2) by the reaction of trialkylphosphites with polyhydroxyl-containing materials, and (3) by transesterifying the reaction products of (1) and (2). The preparation of these phosphite polyols is known in the art as evidenced by U.S. Pat. Nos. 3,359,348; 3,354,241; 3,352,947; 3,351,683; 3,320,337; 3,281,502; 3,246,051; 3,081,331; and 3,009,939; each incorporated herein by reference.

Another group of useful phosphite polyols are the trialkyl phosphite polyols where each of the alkyl groups of the trialkyl phosphites independently have 1 to 20 carbon atoms, preferably 1 to 8. In one embodiment, the polyphosphite polyol has the general formula:

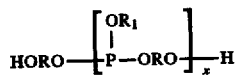

where R is the alkylene glycol or polyalkylene glycol residue, and $R_1$ is the alkyl residue from the trialkyl phosphite, and X is from 1 to 50. Suitable trialkyl phosphites from which the polyol may be derived include triisodecyl phosphite, triisoctyl phosphite, trilauryl phosphite, tristearyl phosphite, tri- methyl, ethyl, propyl, butyl, etc. phosphites, unsaturated phosphites such as triallyl phosphite, and mixed phosphites such as methyldiethyl phosphite and ethyldibutyl phosphite. Also included are the aryl-substituted phosphites.

Typical phosphonate polyols are those prepared (1) by the reaction of alkylene oxides with phosphonic acid, (2) by the reaction of phosphite polyols with alkyl halides, (3) by the condensation of dialkyl phosphites with alkanolamines and formaldehyde, and (4) by transesterifying the products of (1), (2), and (3). The preparation of these phosphonate polyols is known in the art as evidenced by U.S. Pat. Nos. 3,349,150; 3,330,888; 3,342,651; 3,139,450; and 3,092,651.

Typical phosphinate polyols include (1) hydroxyalkyl phosphinic acids, (2) reaction products of alkylene oxides and hydroxyalkyl phosphinic acids, and (3) transesterified reaction products of (2). The preparation of these phosphinate polyols is known in the art as evidenced by U.S. Pat. No. 3,316,333.

Typical phosphoramidates include those disclosed in U.S. Pat. Nos. 3,335,129; 3,278,653; and 3,088,966. Typical polyhydroxyl-containing phosphine oxides include the di- and tri-substituted hydroxylalkyl phosphine oxides such as trihydroxylmethyl phosphine oxides.

Also useful are the polyphosphorus compounds such as polyoxyalkylene polyether polyphosphorus compounds where the polyphosphorus atoms form part of the backbone chain. Illustrative examples are found in U.S. Pat. No. 3,878,270, which describes a polyalkylene glycol polyphosphorus compound having both phosphite and vinylphosphate linkages. Other examples include the polyphosphorus compounds described in U.S. Pat. Nos. 4,094,926; 3,989, 652; 3,840,622; 3,764,640; and 3,767,732. These patents are in their entirety incorporated herein by reference.

Phosphinyl polyether polyols similar to the ones above which are useful in the invention are described in U.S. Pat. Nos. 3,660,314; 3,682,988; 3,760,038; incorporated herein by reference. Such polyols include polyether polyols substituted with organic phosphite groups, organic phosphonite groups, organic phosphinite groups, cyclic phosphite groups, which groups optionally are hydrolyzed to increase the hydroxyl functionality of the polyether polyol. These phosphinyl polyether polyols may be prepared by reacting a polyether polyol having a halogen with an organic phosphonite, phosphinite, or cyclic phosphite compound, where the halogen is replaced by phosphinyl groups.

Aromatic amino polyols containing phosphorus atoms are also useful and described in U.S. Pat. No. 4,681,965. Such polyols are prepared by the Mannich condensation reaction between a phenol, formaldehyde, a primary amine, and an alkanol phosphite. Other aliphatic amino polyols containing phosphorus atoms are described in U.S. Pat. Nos. 3,076,010 and 4,052,487. Each of these patents are incorporated herein by reference.

As a second ingredient used to make the polyurethane foam of the invention, there is provided a b) aliphatic or cycloaliphatic $C_4$–$C_7$ hydrocarbon blowing agent. The blowing agent should have a boiling point of 50° C or less at one atmosphere, preferably 38° C. or less. The hydrocarbon blowing agent may form part of the polyol composition by mixing the hydrocarbon into the polyols prior to foaming, or the hydrocarbon may be mixed with the isocyanate, or both. Generally, the hydrocarbon will be mixed into the polyol composition and form part of the polyol composition immediately prior (within the hour) to reacting the foaming reaction because the hydrocarbons are not very soluble, or completely insoluble, in many polyols used to make polyurethane foams. There may exist some polyols, however, or compatabilizing agents which would be soluble with or bring the hydrocarbons into an emulsion or solution with the polyols, thereby allowing the hydrocarbon to be added to the polyol composition days or weeks prior to the foaming reaction without phase separation.

The hydrocarbon is physically active and has a sufficiently low boiling point to be gaseous at the exothermic temperatures caused by the reaction between the isocyanate and polyols, so as to foam the resulting polyurethane matrix. The hydrocarbon blowing agents consist exclusively of carbon and oxygen, therefore, they are non-halogenated by definition. Examples of the $C_4$–$C_7$ hydrocarbon blowing agents include linear or branched alkanes, e.g. butane, isobutane, 2,3 dimethylbutane, n- and isopentane and technical-grade pentane mixtures, n- and isohexanes, and n- and isoheptanes. Specific examples of alkenes are 1-pentene, 2-methylbutene, 3-methylbutene, and 1-hexene, and of cycloalkanes are cyclobutane, preferably cyclopentane, cyclohexane or mixtures thereof. Preferentially, cyclopentane, n- and isopentane, (including their technical grades) and mixtures thereof are employed.

Other blowing agents which can be used in combination with the one or more $C_4$–$C_7$ hydrocarbon blowing agents may be divided into the chemically active blowing agents which chemically react with the isocyanate or with other formulation ingredients to release a gas for foaming, and the physically active blowing agents which are gaseous at the exotherm foaming temperatures or less without the necessity for chemically reacting with the foam ingredients to provide a blowing gas. Included with the meaning of physically active blowing agents are those gases which are thermally unstable and decompose at elevated temperatures.

Examples of chemically active blowing agents are preferentially those which react with the isocyanate to liberate gas, such as $CO_2$. Suitable chemically active blowing agents include, but are not limited to, water, mono- and polycarboxylic acids having a molecular weight of from 46 to 300, salts of these acids, and tertiary alcohols.

Water is preferentially used as a co-blowing agent with the hydrocarbon blowing agent. Water reacts with the organic isocyanate to liberate $CO_2$ gas which is the actual blowing agent. However, since water consumes isocyanate groups, an equivalent molar excess of isocyanate must be used to make up for the consumed isocyanates.

The organic carboxylic acids used are advantageously aliphatic mono and polycarboxylic acids, e.g. dicarboxylic acids. However, other organic mono- and polycarboxylic acids are also suitable. The organic carboxylic acids may, if desired, also contain substituents which are inert under the reaction conditions of the polyisocyanate polyaddition or are reactive with isocyanate, and/or may contain olefinically unsaturated groups. Specific examples of chemically inert substituents are halogen atoms, such as fluorine and/or chlorine, and alkyl, e.g. methyl or ethyl. The substituted organic carboxylic acids expediently contain at least one further group which is reactive toward isocyanates, e.g. a mercapto group, a primary and/or secondary amino group, or preferably a primary and/or secondary hydroxyl group.

Suitable carboxylic acids are thus substituted or unsubstituted monocarboxylic acids, e.g. formic acid, acetic acid, propionic acid, 2-chloropropionic acid, 3-chloropropionic acid, 2,2-dichlorpropionic acid, hexanoic acid, 2-ethylhexanoic acid, cyclohexanecarboxylic acid, dodecanoic acid, palmitic acid, stearic acid, oleic acid, 3-mercaptopropionic acid, glycoli acid, 3-hydroxypropionic acid, lactic acid, ricinoleic acid, 2-aminopropionic acid, benzoic acid, 4-methylbenzoic acid, salicylic acid and anthranilic acid, and unsubstituted or substituted polycarboxylic acids, preferably dicarboxylic acids, e.g. oxalic acid, malonic acid, succinic acid, fumaric acid, maleic acid, glutaric acid, adipic acid, sebacic acid, dodecanedioic acid, tartaric acid, phthalic acid, isophthalic acid and citric acid. Preferable acids are formic acid, propionic acid, acetic acid, and 2-ethylhexanoic acid, particularly formic acid.

The amine salts are usually formed using tertiary amines, e.g. triethylamine, dimethylbenzylamine, diethylbenzylamine, triethylenediamine, or hydrazine. Tertiary amine salts of formic acid may be employed as chemically active blowing agents which will react with the organic isocyanate. The salts may be added as such or formed in situ by reaction between any tertiary amine (catalyst or polyol) and formic acid contained in the polyol composition.

Combinations of any of the aforementioned chemically active blowing agents may be employed, such as formic acid, salts of formic acid, and/or water.

Physically active blowing agents are those which boil at the exotherm foaming temperature or less, preferably at 50° C. or less at 1 atmosphere. The most preferred physically active blowing agents are those which have an ozone depletion potential of 0.05 or less. Examples of other physically active blowing agents are dialkyl ethers, cycloalkylene ethers and ketones; hydrochlorofluorocarbons (HCFCs); hydrofluorocarbons (HFCs); perfluorinated hydrocarbons (HFCs); fluorinated ethers (HFCs); and decomposition products.

Any hydrochlorofluorocarbon blowing agent may be used in the present invention. Preferred hydrochlorofluorocarbon blowing agents include 1-chloro-1,2-difluoroethane; 1-chloro-2,2-difluoroethane (142a); 1-chloro-1,1-difluoroethane (142b); 1,1-dichloro-1-fluoroethane (141b); 1-chloro-1,2,2-trifluoroethane; 1-chloro-1,2,2-trifluoroethane; 1,1-dichloro-1,2-difluoroethane; 1-chloro-1,1,2,2-tetrafluoroethane (124a); 1-chloro-1,2,2,2-tetrafluoroethane (124); 1,1-dichloro-1,2,2-trifluoroethane; 1,1-dichloro-2,2,2-trifluoroethane (123); and 1,2-dichloro-1,1,2-trifluoroethane (123a); monochlorodifluoromethane (HCFC-22); 1-chloro-2,2,2-trifluoroethane (HCFC-133a); gem-chlorofluoroethylene (R-1131a); chloroheptafluoropropane (HCFC-217); chlorodifluoroethylene (HCFC-1122); and transchlorofluoroethylene (HCFC-1131). The most preferred hydrochlorofluorocarbon blowing agent is 1,1-dichloro-1-fluoroethane (HCFC-141b).

Suitable hydrofluorocarbons, perfluorinated hydrocarbons, and fluorinated ethers include difluoromethane (HFC-32); 1,1,1,2-tetrafluoroethane (HFC-134a); 1,1,2,2-tetrafluoroethane (HFC- 134); 1,1-difluoroethane (HFC- 152a); 1,2-difluoroethane (HFC-142), trifluoromethane; heptafluoropropane; 1,1,1-trifluoroethane; 1,1,2-trifluoroethane; 1,1,1,2,2-pentafluoropropane; 1,1,1,3-tetrafluoropropane; 1,1,2,3,3-pentafluoropropane; 1,1,1,3,3-pentafluoro-n-butane; hexafluorocyclopropane (C-216); octafluorocyclobutane (C-318); perfluorotetrahydrofuran; perfluoroalkyl tetrahydrofurans; perfluorofuran; perfluoropropane, -butane, -cyclobutane, -pentane, -cyclopentane, and -hexane, -cyclohexane, -heptane, and -octane; perfluorodiethyl ether; perfluorodipropyl ether; and perfluoroethyl propyl ether.

Decomposition type physically active blowing agents which release a gas through thermal decomposition include pecan flour, amine/carbon dioxide complexes, and alkyl alkanoate compounds, especially methyl and ethyl formates.

There may also be mentioned as a blowing agent a mono-halogenated hydrocarbon having from three to six carbon atoms. More specifically, one may use a secondary or tertiary mono-halogenated aliphatic hydrocarbon blowing agent having three (3) to six (6) carbon atoms, which enables the halogen to disassociate from the hydrocarbon as a free radical. The halogen atom is a secondary or tertiary halogen atom on the carbon backbone. The hydrocarbon itself may be substituted with alkyl groups. Examples of suitable mono-halogenated hydrocarbons that may be used as co-blowing agents in conjunction with the aliphatic or cycloaliphatic $C_4$–$C_7$ hydrocarbon include 2-chloropropane, 2-chlorobutane, tertiary butyl chloride, and the iodine, fluorine, or bromine halogen substituted compounds of the foregoing, preferably a secondary mono-halogenated aliphatic hydrocarbon with 3 to 4 carbon atoms, further with chlorine as the halogen. The most preferred compound in this class is 2-chloropropane.

The total and relative amounts of blowing agents will depend upon the desired foam density, the type of hydrocarbon, and the amount and type of additional blowing agents employed. Polyurethane foam densities typical for rigid polyurethane insulation applications range from free rise densities of 1.3 to 2.5 pcf, preferably from 1.3 to 2.1 pcf, and overall molded densities of 1.5 to 3.0 pcf. The amount by weight of all blowing agents is generally 10 php to 40 php, preferably 20 php to 35 php (php means parts per hundred parts of all polyols). Based on the weight of all the foaming ingredients, the total amount of blowing agent is generally from 4 wt % to 15 wt %. The amount of hydrocarbon blowing agent, based on the weight of all the foaming ingredients, is also from 4 wt % to 15 wt %, preferably from 6 wt % to 10 wt %.

Water is typically found in minor quantities in the polyols as a byproduct and may be sufficient to provide the desired blowing from a chemically active substance. Preferably, however, water is additionally introduced into the polyol composition in amounts from 0.05 to 5 php, preferably from 0.25 to 1.0 php.

As the third ingredient in the polyol composition, there is a silicone-containing polymer surfactant. This polymer will generally contain the moiety, —Si($R_2$)O—, where the R groups are independently an alkyl radical having 1 to 20 carbon atoms; an alicyclic, an aryl, an alkaryl or an aralkyl having 1 to 25 carbon atoms in the alkyl group; an aliphatic ether group; or a polyester group, preferably an alkyl radical having from 1 to 4 carbon atoms. The silicone-containing polymer utilized in the invention can be hydroxyl functional such as a polymer modified with polyoxyalkylene polyether groups terminated with hydroxyl groups, or alternatively and more preferably are those silicone-containing polymers modified with polyoxyalkylene polyether groups terminated with hydrocarbon groups, which are non-reactive with the organic isocyanate.

The hydroxyl functional silicone polymer can contain two or more secondary hydroxyl groups, and more preferably an average of three hydroxyl groups per silicone-containing polymer molecule. In one aspect of the invention, the silicone-containing polymer is a dimethylsiloxane compound which is represented by the following generic formula:

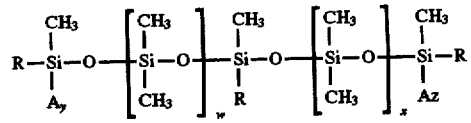

wherein each of R are independently an alkyl radical having 1 to 20 carbon atoms; an alicyclic, an aryl, an alkaryl or an aralkyl having 1 to 25 carbon atoms in the alkyl group; an aliphatic ether group; or a polyester group; and wherein a secondary hydroxyl functional group is substituted onto at least two, preferably onto each of the R groups;

each of A is independently one or more silicon atoms containing alkyl, alicyclic, cycloalkyl, aryl, alkyloxy, alkaryl, aralkyl, or arylalkoxy have a 1 to 25 carbon atoms in each aliphatic portion; an organosiloxane; hydrogen; or an alkyl having 1 to 25 carbon atoms;

the sum of w+x totals an integer which would correspond to a polymer having an average hydroxyl equivalent weight ranging from 200 to 4,000.

Preferably, each of R are independently an alkyl having from 1 to 10 carbon atoms, an alkoxy, or an ether having the formula:

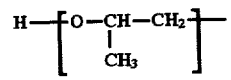

and preferably A is hydrogen, a $C_1$–$C_4$ alkyl, or a siloxane having the formula:

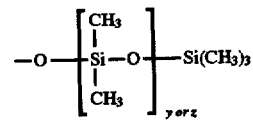

wherein n is an integer from 1 to 6, and w+x+y+z totals an integer corresponding to an average hydroxyl equivalent weight of the molecule ranging from 1,250 to 3,000.

One example of a hydroxyl functional polymer is represented by the formula:

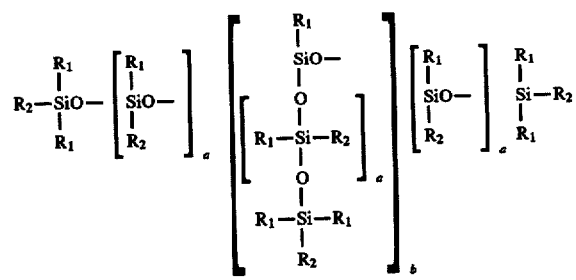

wherein
$R^1$ groups are the same or different and represent alkyl groups with 1 to 4 carbon atoms, phenyl groups, or groups with the formula:

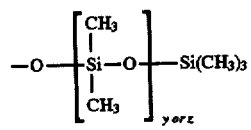

$R_2$ groups can have the same meaning as the $R_1$ groups, with the proviso that at least one $R_2$ group is a hydroxyl functional $C_1$–$C_8$ hydrocarbon or one or more oxyalkylene groups terminated with a hydroxyl group;

a has a value of 1 to 1000; and b has a value of 0 to 10.

A species of the above identified hydroxyl functional silicone polymer corresponds with the formula:

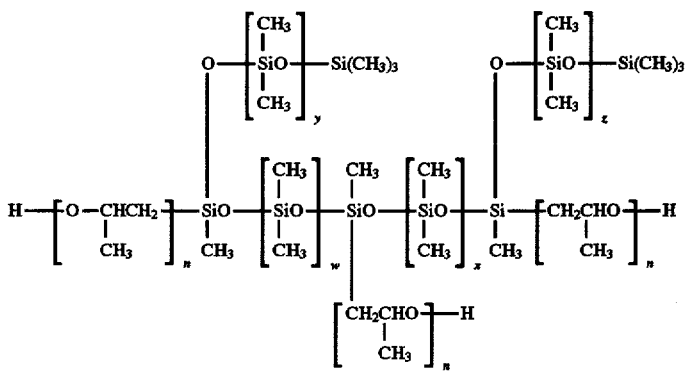

wherein each n is independently an integer ranging from 1 to 4, and w+x+y+z is about 70, or corresponds to average hydroxyl equivalent weight of a molecule of about 2,000. The methods of manufacture of such silicone-containing hydroxyl functional polymers and the polymer products are generally described in U.S. Pat. Nos. 4,130,708 and 5,391,679, the disclosure of which each is hereby incorporated by reference.

Also useful as the silicone polymer used in the invention are the polysiloxane-oxyalkylated polymers terminated with hydrocarbon groups. Examples of such surfactants include the branched organosiloxane polyglycol block copolymers having a weight average molecular weight of less than about 30,000. Such surfactants include the poly(dimethyl)siloxane polyoxyalkylene copolymers having a weight average molecular weight of preferably less than 10,000, with a dimethyl siloxane content of from about 15% to about 40% with of the total polymer and an oxyethylene content of greater than about 60, most preferably about 100 weight percent of the polyoxyalkylene glycol moiety and an oxyethylene content greater than about 40% of the total surfactant polymer.

Specific examples of polysiloxane-oxyalkylated polymers terminated with hydrocarbon groups include the L series supplied by Union Carbide, such as L-5340, L-5420, and L-5440. Other examples include LK-221 and LK-448 from Air Products and Chemicals Co.

In one embodiment, the silicone surfactants (hereinafter called siloxane-oxyalkylene copolymer A) are hydrolyzable siloxane-oxyalkylene copolymers (hereinafter called siloxane-oxyalkylene copolymer A-1) expressed by the general formula (I):

wherein x is an integer of at least 1 and stands for the number of trifunctional silicon atoms; y is an integer of at least 3 and stands for the number of difunctional siloxane units; z is an integer of at least 5 and stands for the length of a polyoxyalkylene chain; a is an integer and stands for the number of polyoxyalkylene units; n is an integer of 2 to 4 and stands for the number of carbon atoms in an oxyalkylene group; R' is a monovalent hydrocarbon group, e.g., a $C_1$–$C_6$ alkyl or an aralkyl group; R" is a monovalent hydrocarbon group, e.g., alkyl or aralkyl, forming a monoether group at the end of an alkylene chain; and each R group is independently an alkyl group, such as a $C_1$–$C_6$ alkyl, or a trihydrocarbylsilyl group at an end of a siloxane group, the polymer being characterized by containing 10 to 80 percent by weight polysiloxane units and 90 to 20 percent by weight of polyoxyalkylene units, having polysiloxane chains and polyoxyalkylene chains bonded with a C—O—Si bond and having a molecular weight of 1,000 to 16,000.

Alternatively, siloxane-oxyalkylene copolymer A in the present invention can also be used as a non-hydrolyzable siloxane-oxyalkylene copolymer (hereinafter called siloxane-oxyalkylene copolymer A-II) expressed by the general formula (II):

R'$_3$SiO(R$_2$SiO)$_y$[RO(CnH$_{2n}$O)$_z$SiRO]$_w$SiR$_3$ wherein w is an integer of at least 1, y is an integer of at least 3 and stands for the number of difunctional siloxane units; z is an integer of at least 5 and stands for the length of a polyoxyalkylene chain; n is an integer of 2 to 4 and stands for the number of carbon atoms in an oxyalkylene group; each of R' and each R are independently the same as defined in the above formula (I), the polymer being characterized by containing 5 to 95 percent by weight, preferably 5 to 50 percent by weight of polysiloxane units and 95 to 5 percent by weight, preferably 95 to 50 percent by weight of polyoxyalkylene units, having a polysiloxane chain and a polyoxyalkylene chain bonded with a C—Si bond (instead of a C—O—Si bond) and having a molecular weight of 1,000 to 16,000.

As a specific example of a species of copolymer A-II, there can be mentioned a polymer corresponding to the formula:

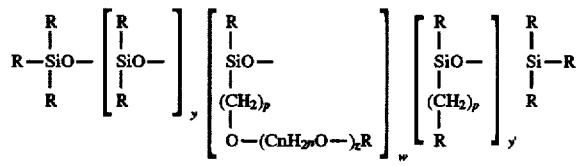

wherein w, y, z, n, and R are as defined above. The y and y' together are as defined by the y group above, such that the sum of y and y' must be at least 3 and each is at least 1. The p groups are independently integers from 2 to 17. Methods of manufacturing this polymer are described in U.S. Pat. No. 4,698,178, incorporated herein by reference.

As an example of a low molecular weight siloxane-oxyalkylene copolymer (hereinafter called siloxane-oxyalkylene copolymer B) there can be mentioned a hydrolyzable siloxane-oxyalkylene copolymer (hereinafter called siloxane-oxyalkylene copolymer B-I) expressed by the general formula (III):

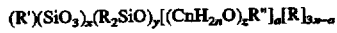

where x is an integer of at least 1 and stands for the number of trifunctional silicon atoms; y is an integer of at least 3 and stands for the number of difunctional siloxane units; z is an integer of 0 or 1 to 4 and stands for the length of a polyoxyalkylene chain; a is an integer and stands for the number of polyoxyalkylene units; n is an integer of 2 to 4 or mixtures thereof, and stands for the number of carbon atoms in an oxyalkylene group; R' is an x-valent hydrocarbon group, e.g., when x is 1, a monovalent hydrocarbon group such as alkyl and when x is 2, a divalent hydrocarbon group such as alkylene; R" is a monovalent hydrocarbon group such as alkyl, aryl or aralkyl and forms a monoether group at the end of a polyoxyalkylene chain; and R is an alkyl group or trihydrocarbylsilyl group at an end of a siloxane group. The polymer is characterized by containing more than 80 percent by weight of polysiloxane units and less than 20 percent by weight of polyoxyalkylene units, having a polysiloxane chain and a polyoxyalkylene chain bonded with a C—O—Si bond and having a molecular weight of 500 to 10,000.

Alternatively, siloxane-oxyalkylene copolymer B in the present invention can also be used as a non-hydrolyzable siloxane-oxyalkylene copolymer (hereinafter called siloxane-oxyalkylene copolymer B-II) expressed by the general formula (IV):

where w is an integer of at least 1, 6, z, n, and R and R' are the same as defined in the above formula (III), characterized by containing more than 95 percent by weight of polysiloxane units and less than 5 percent by weight of polyoxyalkylene units, having a polysiloxane chain and a polyoxyalkylene chain bonded with a C—Si bond (instead of a C—O—Si bond) and having a molecular weight of 500 to 10,000. The above polysiloxane-polyoxyalkylene copolymers are described in U.S. Pat. No. 4,119,582.

The siloxane-oxyalkylene copolymer may be prepared by reacting a monoalkylene ether, preferably the allyl ether, of the desired polyoxyalkylene glycol with a siloxane containing SiH group.

The reaction is carried out by heating a mixture of the two reactants in the presence of a platinum catalyst such as chloroplatinic acid dissolved in a small amount of isopropyl alcohol, at temperatures from 100° to 200° C.

The siloxanes can be of four formulae:

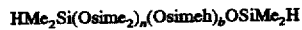

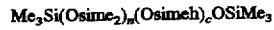

and

wherein R is a hydrocarbon radical free of aliphatic unsaturation and contains from 1 to 10 carbon atoms. Me is a methyl radical; a has an average value from 0–1; n has an average value from 6–240; d has an average value from 0–30; b has an average value from 1–30; and c has an average value from 3–30 to the extent that the ratio of total Me$_2$SiO units to total

units is within the range of 3.5:1 to 15:1, wherein G is a radical of the structure -D(OR")$_{Ma}$ wherein D is an alkylene radical containing from 1 to 30 carbons atoms, A is a radical selected from the group consisting of the —OR', —OOCR', and —OCOR' radicals wherein R' is a hydrocarbon radical free of aliphatic unsaturation selected from the group consisting of hydrocarbon and radicals, the A radical containing a total of less than 11 atoms, R" is composed of oxyalkylene radicals such as ethylene, propylene, and butylene radicals, the amount of ethylene radicals relative to the other alkylene radicals being such that the ratio of carbon atoms to oxygen atoms in the total OR" block ranges from 2.3:1 to 2.8:1, and m has an average value from 25 to 100.

Any of the siloxanes 1–4 or mixtures of siloxanes 14 can be utilized which give rise to a copolymer when reacted with an unsaturated glycol, in which the ratio of total Me$_2$SiO units to total

units are derived from the corresponding SiH units so that the same ratio of Me$_2$SiO units to SiH units prevails as for the Me$_2$SiO units to

units.

The above siloxanes are prepared by cohydrolyzing the appropriate siloxanes as for instance in (1) above, a mixture of silanes such as R$_a$SiX$_{4-a}$ with dimethyldichlorosilane, methyldichlorosilane, and dimethylmonochlorosilane, and thereafter equilibrating the cohydrolyzate with an acid catalyst such as H$_2$SO$_4$. Number (2) is prepared by cohydrolyzing the silanes in a portion of n moles of dimethyldichlorosilane, two moles of dimethylmonochlorosilane, and b moles of methyldichlorosilane. Once again the hydrolyzate is H$_2$SO$_4$ equilibrated. Number (3) is prepared by cohydrolyzing the silanes in the proportion of n moles of dimethyldichlorosilane, two moles of trimethylmonochlorosilane and c moles of methyldichlorosilane. Once again the hydrolyzate is H$_2$SO$_4$ equilibrated. Number (4) is prepared by cohydroxylyzing one mole of silane of the formula R$_a$SiX$_{4-a}$ with n moles of dimethyldichlorosilane, c moles of methyldichlorosilane and thereafter equilibrating with H$_2$SO$_4$. In such case, X is chlorine.

Another method of preparing the siloxanes is to equilibrate siloxanes that have already been hydrolyzed. Such a method for instance would involve the equilibration at temperatures in excess of 50° C., a mixture of n units of Me$_2$SiO in the form of octamethylcyclotetrasiloxane, b units of (MeHSiO) in the form of (MeHSiO)$_4$ and 1 unit of (Hme$_2$Si)$_2$O in the presence of an equilibrating catalyst. Such equilibrating catalysts are known in the art and consist of acid clays, acid treated melamine type resins and fluorinated alkanes with sulfonic acid groups. For those unfamiliar with such preparations, they can be found in detail in U.S. Pat. No. 3,402,192, and that patent is hereby incorporated by reference.

The monoalkylene ether of the desired polyoxyalkylene glycol can be a copolymer of ethylene oxide and propylene oxide or copolymers of ethylene oxide and butylene oxide or can be copolymers of all three oxides. The ratio of ethylene radicals relative to the other alkylene radicals should be such that the ratio of carbon atoms to oxygen atoms in the glycol copolymer ranges from 2.3:1 to 2.8:1. In addition, the ends of the polyglycol chain not attached to the siloxane moiety have a group A wherein A is defined above.

These glycol copolymers can be linear or branched and can contain any number of carbon atoms.

One method of preparing the glycol copolymers is to dissolve sodium metal in allyl alcohol in a mole ratio of one to one and reacting the resulting product with the appropriate oxides at elevated temperatures and under pressure. The resulting product, after purification by removal of low boilers, is then capped with the appropriate group A.

The siloxane-oxyalkylene copolymer is then prepared by reacting the appropriate siloxane precursor and the appropriate polyglycol copolymer at elevated temperatures in the presence of platinum as the catalyst and a solvent if desired. These polysiloxane-polyoxyalkylene copolymers are described in U.S. Pat. No. 4,147,847.

Other types of silicone containing polymers within the scope of the invention include the so called inverted polymers wherein the polyoxyalkylene chain forms the backbone of the polymer and the polysiloxane chains form the pendant or terminal groups. Such structures and methods of preparation are described in U.S. Pat. No. 5,045,571, incorporated herein by reference.

The silicone-containing polymer is used in amounts of at least about 8 php (parts per hundred parts of polyol). At lower levels conventionally used in polyurethane/polyisocyanurate foam formulations, i.e. 2 php, the flame retardancy and thermal conductivity of the hydrocarbon blown foams of the present invention are not affected. Surprisingly, it was only at the higher levels of about 8 php or more that the mechanical properties of the foam across the board improved significantly, that is, the flame retardance, the aged thermal conductivity, the compressive strength, and the friability. For example, at levels of 6 php of surfactant, there was no significant improvement in the mechanical properties of the foam as compared to when 8 php of the silicone polymer surfactant was used. The upper level on the amount of surfactant used is not limited except that for cost considerations, the amount should be kept as low as possible while obtaining the beneficial effects of the silicone-polymer.

Additional optional ingredients in the polyol composition may include isocyanate and/or isocyanurate promoting catalysts, flame retardants, and fillers.

Catalysts may be employed which greatly accelerate the reaction of the compounds containing hydroxyl groups and with the modified or unmodified polyisocyanates. Examples of suitable compounds are cure catalysts which also function to shorten tack time, promote green strength, and prevent foam shrinkage. Suitable cure catalysts are organometallic catalysts, preferably organotin catalysts, although it is possible to employ metals such as lead, titanium, copper, mercury, cobalt, nickel, iron, vanadium, antimony, and manganese. Suitable organometallic catalysts, exemplified here by tin as the metal, are represented by the formula: $R_nSn[X—R^1—Y]_2$, wherein R is a $C_1–C_8$ alkyl or aryl group, $R^1$ is a $C_0–C_{18}$ methylene group optionally substituted or branched with a $C_1–C_4$ alkyl group, Y is hydrogen or an hydroxyl group, preferably hydrogen, X is methylene, an —S—, an —$SR^2COO$—, —SOOC—, an —$O_3S$—, or an —OOC— group wherein $R^2$ is a $C_1–C_4$ alkyl, n is 0 or 2, provided that $R^1$ is $C_0$ only when X is a methylene group. Specific examples are tin (II) acetate, tin (II) octanoate, tin (II) ethylhexanoate and tin (II) laurate; and dialkyl (1–8C) tin (IV) salts of organic carboxylic acids having 1–32 carbon atoms, preferably 1–20 carbon atoms, e.g., diethyltin diacetate, dibutyltin diacetate, dibutyltin dilaurate, dibutyltin maleate, dihexyltin diacetate, and dioctyltin diacetate. Other suitable organotin catalysts are organotin alkoxides and mono or polyalkyl (1–8C) tin (IV) salts of inorganic compounds such as butyltin trichloride, dimethyl- and diethyl- and dibutyl- and dioctyl- and diphenyl- tin oxide, dibutyltin dibutoxide, di(2-ethylhexyl) tin oxide, dibutyltin dichloride, and dioctyltin dioxide. Preferred, however, are tin catalysts with tin-sulfur bonds which are resistant to hydrolysis, such as dialkyl (1–20C) tin dimercaptides, including dimethyl-, dibutyl-, and dioctyl- tin dimercaptides.

Tertiary amines also promote urethane linkage formation, and include triethylamine, 3-methoxypropyldimethylamine, triethylenediamine, tributylamine, dimethylbenzylamine, N-methyl-, N-ethyl- and N-cyclohexylmorpholine, N,N,N', N'-tetramethylethylenediamine, N,N,N',N'-tetramethylbutanediamine or -hexanediamine, N,N,N'-trimethyl isopropyl propylenediamine, pentamethyldiethylenetriamine, tetramethyldiaminoethyl ether, bis(dimethylaminopropyl)urea, dimethylpiperazine, 1-methyl-4-dimethylaminoethylpiperazine, 1,2-dimethylimidazole, 1-azabicylo[3.3.0]octane and preferably 1,4-diazabicylo[2.2.2]octane, and alkanolamine compounds, such as triethanolamine, triisopropanolamine, N-methyl- and N-ethyldiethanolamine and dimethylethanolamine.

To prepare the polyisocyanurate (PIR) and the PUR-PIR foams of the invention, a polyisocyanurate catalyst is employed. Suitable polyisocyanurate catalysts are alkali salts, for example, sodium salts, preferably potassium salts and ammonium salts, of organic carboxylic acids, expediently having from 1 to 8 carbon atoms, preferably 1 or 2 carbon atoms, for example, the salts of formic acid, acetic acid, propionic acid, or octanoic acid, and tris (dialkylaminoethyl)-, tris(dimethylamninopropyl)-, tris (dimethylaminobutyl)- and the corresponding tris (diethylaminoalkyl)-s-hexahydrotriazines. However, (trimethyl-2-hydroxypropyl)ammonium formate, (trimethyl-2-hydroxypropyl)ammonium octanoate, potassium acetate, potassium formate and tris (dimethylaminopropyl)-s-hexahydrotriazine are polyisocyanurate catalysts which are generally used. The suitable polyisocyanurate catalyst is usually used in an amount of from 1 to 10 php, preferably from 1.5 to 8 php.

Examples of suitable flame retardants are tetrakis(2-chloroethyl) ethylene phosphonate, tris(1,3-dichloropropyl) phosphate, tris(beta-chloroethyl) phosphate, tricresyl phosphate, tris(2,3-dibromopropyl)phosphate, tris(beta-chloropropyl)phosphate,tricresyl phosphate, and tris(2,3-dibromopropyl) phosphate.

In addition to the above-mentioned halogen-substituted phosphates, it is also possible to use inorganic or organic flameproofing agents, such as red phosphorus, aluminum oxide hydrate, antimony trioxide, arsenic oxide, ammonium polyphosphate (Exolit®) and calcium sulfate, expandable graphite or cyanuric acid derivatives, e.g., melamine, or mixtures of two or more flameproofing agents, e.g., ammonium polyphosphates and melamine, and, if desired, corn starch, or ammonium polyphosphate, melamine, and expandable graphite and/or, if desired, aromatic polyesters, in order to flameproof the polyisocyanate polyaddition products. In general, from 2 to 50 php, preferably from 5 to 25 php, of said flameproofing agents may be used.

Optional fillers are conventional organic and inorganic fillers and reinforcing agents. Specific examples are inorganic fillers, such as silicate minerals, for example, phyllosilicates such as antigorite, serpentine, hornblendes, amphiboles, chrysotile, and talc; metal oxides, such as kaolin, aluminum oxides, titanium oxides and iron oxides; metal salts, such as chalk, baryte and inorganic pigments, such as cadmium sulfide, zinc sulfide and glass, inter alia; kaolin (china clay), aluminum silicate and coprecipitates of barium sulfate and aluminum silicate, and natural and synthetic fibrous minerals, such as wollastonite, metal, and glass fibers of various lengths. Examples of suitable organic fillers are carbon black, melamine, colophony, cyclopentadienyl resins, cellulose fibers, polyamide fibers, polyacrylonitrile fibers, polyurethane fibers, and polyester fibers based on aromatic and/or aliphatic dicarboxylic acid esters, and in particular, carbon fibers.

The inorganic and organic fillers may be used individually or as mixtures and may be introduced into the polyol composition or isocyanate side in amounts of from 0.5 to 40 percent by weight, based on the weight of components (the polyols and the isocyanate); but the content of mats, nonwovens and wovens made from natural and synthetic fibers may reach values of up to 80 percent by weight.

There is also provided as part of the invention a polyisocyanate-based foamable composition made up of an organic isocyanate component and a polyol composition component, where the $C_4$–$C_7$ hydrocarbon blowing agent is mixed into the polyol composition ingredients and/or dispersed in both the isocyanate component and the polyol composition ingredients. The exact amount of hydrocarbon blowing agent used in the aromatic organic polyisocyanate and/or the polyol composition will depend upon the desired density and solubility limits of each component.

The organic polyisocyanates include all essentially known aliphatic, cycloaliphatic, araliphatic and preferably aromatic multivalent isocyanates. Specific examples include: alkylene diisocyanates with 4 to 12 carbons in the alkylene radical such as 1,12-dodecane diisocyanate, 2-ethyl-1,4-tetramethylene diisocyanate, 2-methyl-1,5-pentamethylene diisocyanate, 1,4-tetramethylene diisocyanate and preferably 1,6-hexamethylene diisocyanate; cycloaliphatic diisocyanates such as 1,3- and 1,4-cyclohexane diisocyanate as well as any mixtures of these isomers, 1-isocyanato-3,3,5-trimethyl-5-isocyanatomethylcyclohexane (isophorone diisocyanate), 2,4- and 2,6-hexahydrotoluene diisocyanate as well as the corresponding isomeric mixtures, 4,4'-2,2'-, and 2,4'-dicyclohexylmethane diisocyanate as well as the corresponding isomeric mixtures and preferably aromatic diisocyanates and polyisocyanates such as 2,4- and 2,6-toluene diisocyanate and the corresponding isomeric mixtures 4,4'-, 2,4'-, and 2,2'-diphenylmethane diisocyanate and the corresponding isomeric mixtures, mixtures of 4,4'- and 2,4'-diphenylmethane diisocyanates and polyphenylenepolymethylene polyisocyanates (polymeric MDI), as well as mixtures of polymeric MDI and toluene diisocyanates. The organic di- and polyisocyanates can be used individually or in the form of mixtures.

Frequently, so-called modified multivalent isocyanates, i.e., products obtained by the partial chemical reaction of organic diisocyanates and/or polyisocyanates are used. Examples include diisocyanates and/or polyisocyanates containing ester groups, urea groups, biuret groups, allophanate groups, carbodiimide groups, isocyanurate groups, and/or urethane groups. Specific examples include organic, preferably aromatic, polyisocyanates containing urethane groups and having an NCO content of 33.6 to 15 weight percent, preferably 31 to 21 weight percent, based on the total weight, e.g., with low molecular weight diols, triols, dialkylene glycols, trialkylene glycols, or polyoxyalkylene glycols with a molecular weight of up to 1500; modified 4,4'-diphenylmethane diisocyanate or 2,4- and 2,6-toluene diisocyanate, where examples of di- and polyoxyalkylene glycols that may be used individually or as mixtures include diethylene glycol, dipropylene glycol, polyoxyethylene glycol, polyoxypropylene glycol, polyoxyethylene glycol, polyoxypropylene glycol, and polyoxypropylene polyoxyethylene glycols or -triols. Prepolymers containing NCO groups with an NCO content of 25 to 9 weight percent, preferably 21 to 14 weight percent, based on the total weight and produced from the polyester polyols and/or preferably polyether polyols described below; 4,4'-diphenylmethane diisocyanate, mixtures of 2,4'- and 4,4'-diphenylmethane diisocyanate, 2,4,- and/or 2,6-toluene diisocyanates or polymeric MDI are also suitable. Furthermore, liquid polyisocyanates containing carbodiimide groups having an NCO content of 33.6 to 15 weight percent, preferably 31 to 21 weight percent, based on the total weight, have also proven suitable, e.g., based on 4,4'- and 2,4'- and/or 2,2'-diphenylmethane diisocyanate and/or 2,4'- and/or 2,6-toluene diisocyanate. The modified polyisocyanates may optionally be mixed together or mixed with unmodified organic polyisocyanates such as 2,4'- and 4,4'-diphenylmethane diisocyanate, polymeric MDI, 2,4'-and/or 2,6-toluene diisocyanate.

Preferably, the isocyanate used to make the closed cell rigid foams of the invention contain polymeric MDI, with the average functionality of the isocyanate component used to react with the polyol composition being 2.2 or more, more preferably 2.5 or more, most preferably 2.7 or more.

The foams of the invention are closed cell, meaning that greater than 80% of the cells are closed as measured for uncorrected porosity. Preferably, greater than 85%, more preferably 90% or more of the cells are closed as measured for uncorrected porosity. The foams of the invention are also rigid, meaning that they have a compressive strength to tensile strength ratio of at least 1.0 and an elongation at yield of less than 10%.

The foams of this invention are polyisocyanate based, meaning that the foams may be considered polyurethane, polyisocyanurate, or any mixture of the two linkages. Polyisocyanurate foams are usually made by reacting the isocyanate component with the polyol composition component at an isocyanate index of 150 or more, preferably at an index of 250 or more, while polyurethane foams are made at isocyanate indices of 60–120, more usually at indices of 100 to 115. The isocyanate index is defined as the molar ratio of isocyanate groups to the isocyanate reactive groups multiplied by 100.

The foams of the invention also exhibit numerous improvements in mechanical properties. In one embodiment of the invention, the polyisocyanate foams employing about 8 php of the silicone containing surfactant polymer have a 10% or less shift in thermal insulation loss over a 30 day period as measured according to ASTM C518 from a core sample of a 10% overpacked molded foam. Without the high levels of surfactant polymer, the thermal insulation loss at the conclusion of a 30 day period is higher than 10%, such as 15–20%. The thermal insulation loss is calculated as follows:

$$\frac{30 \text{ day } k \text{ factor} - \text{initial } k \text{ factor}}{\text{initial } k \text{ factor}} \times 100$$

In another advantageous embodiment, the foams have reduced flammability as measured by the increase in weight retentions in a Butler Chimney test. In experiments shown below, we have found that the weight retention increased by at least 3.0%, in some cases by 4.0 or 4.5%, over the same foam using less than 8 php of the surfactant and keeping the ingredients and all other amounts identical.

In a method of the invention, an organic aromatic polyisocyanate and the polyol composition are fed through two separate lines to a high pressure impingement mixhead. The components are intimately mixed under high pressure for less than two (2) seconds and dispensed through the mixhead onto a substrate, such as a conveyor belt, a facer, or a mold surface. The foamable mixed composition is allowed to foam and cure.

Applications for the foams made by the present invention are laminate board for building and housing insulation, refrigeration appliance cabinets, entry way door insulation, and any other application requiring rigid polyisocyanate foams using polyester-based polyols.

The following examples illustrate the nature of the invention and do not limit the scope of the invention as described above and in the claims below. Various modification and different formulations from those described in these examples can be made within the spirit and scope of the invention specified herein.

| | |
|---|---|
| Polyol A | is Terate 2541, a polyester polyol derived from DMT and commercially available from Cape Industries. |
| Polyol B | is Weston PTP, a phosphite initiated polyol commercially available from General Electric Company. |
| Polyol C | is Stepanpol 2502, a polyester polyol derived from phthalic anhydride containing a reacted compatibilizing agent based on a phenolic compound, commercially available from Stepan. |
| L-5440 | is an oxyalkylene-silicone surfactant terminated with hydrocarbon groups, commercially available from Union Carbide. |
| B-8462 | is an oxyalkylene-silicone surfactant terminated with hydrocarbon groups commercially available from Goldschmidt. |
| Polycat 5 | is pentamethyl-diethylene triamine, a catalyst for rigid foam applications commercially available from Air Products. |
| HexCem 977 | is a potassium octoate trimerization catalyst commercially available from Mooney Chemical. |
| Isocyanate A | is a polymeric MDI having a free NCO content of 31.4, a viscosity of about 700 cps at 23° C., and having a functionality greater than 2.7, commercially available from BASF Corporation. |

EXAMPLE 1

The polyol composition ingredients were mixed in a stainless steel, three-gallon premix tank by a drill press equipped with a German mixblade at 1200 rpm for about thirty (30) minutes. The stainless steel three-gallon premix tank was positioned on a load scaled to measure the weight of the ingredients during the blending operation, and any cyclopentane gas escaping was continually replenished during the blending to keep the parts by weight of the gas constant. The premix tank was attached to a resin day tank on an Edge Sweets machine. The contents of the premix tank were gravity-fed to the resin day tank and kept under continuous agitation. When a shot of material was required, the polyol composition in the day tank was pumped through an in-line mixer to the mixhead, where it was impingement mixed with Iso A. The calibration of the machine was as stated in Table I below. The impingement mixed polyol composition and isocyanate were shot into #10 Lilly cups for measurement of the density, and into 4"×10"×10" wooden boxes fit with cake boxes of the same dimension, which boxes were also packed at 10 percent beyond the theoretical needed to fill the box volume.

TABLE 1

| Samples | 1 | 2 | 3 | 4 |
|---|---|---|---|---|
| Polyol A | 100 | 100 | 100 | 100 |
| L-5440 | 2.0 | 4.0 | 6.0 | 8.0 |
| HexChem 977 | 3.0 | 3.0 | 3.0 | 3.0 |
| Polycat 5 | 0.5 | 0.5 | 0.5 | 0.5 |
| Cyclopentane | 30 | 30 | 30 | 30 |
| Water | 0.5 | 0.5 | 0.5 | 0.5 |
| Total | 136 | 138 | 140 | 142 |
| Iso A | 193.44 | 193.44 | 193.44 | 193.44 |
| Index | 300 | 300 | 300 | 300 |
| #10 Lily Cup, pcf | 1.54 | 1.52 | 1.49 | 1.65 |
| Reactivity (seconds) | | | | |
| Shot Time | 3.0 | 3.0 | 3.0 | 3.0 |
| Cream | 5.3 | 5.0 | 4.5 | 5.6 |
| Gel | 30 | 26 | 25 | 23 |
| Rise | 76 | 78 | 69 | 69 |
| Tack-Free | 46 | 62 | 48 | 40 |
| Free-Rise Box | | | | |
| Weight | 186.6 | 175.2 | 174.4 | 187.1 |
| Pcf | 1.78 | 1.67 | 1.66 | 1.78 |
| Shrinkage | none | none | none | none |
| Friability | surface | surface | surface | surface |
| 10 Percent Packed Box | | | | |
| Weight, grams | 205.6 | 193.9 | 192.0 | 207.1 |
| Pcf | 1.96 | 1.85 | 1.83 | 1.97 |
| Calibration | | | | |
| Resin | 89.7 | 89.3 | 92.7 | 94.4 |
| Iso | 127.7 | 127 | 127.6 | 127.9 |
| RPM Resin | 633 | 633 | 653 | 653 |
| RPM Iso | 750 | 750 | 750 | 750 |
| Pressure Resin | 2000 | 2000 | 2000 | 2000 |
| Pressure Iso | 2000 | 2000 | 2000 | 2000 |

The foams packed at 10% theoretical were subjected to testing to evaluate the compressive strength according to ASTM D1621, the k-factors according to ASTM C518, and the Butler Chimneys according to ASTM D3014. The results, reported in Table II below, indicate that foams made at similar densities having identical ingredients in identical amounts, with the exception of varying the amount of surfactant, had significantly greater compressive strength, greater flammability resistance as measured by the greater weight retention in the Butler Chimney test, lower aged k-factors, and lower surface friability when the amount of surfactant was increased to 8 php. At amounts of from 2, 4, and 6 php, no significant improvement in these properties was evident. At the lower levels, there existed a gradual improvement in the compression strength and friability of the foams tested, but not in the k-factors or the flammability resistance. A significant jump in compression and friability values, and the first noticeable improvement in the k-factors and flame resistance, occurred only when the amount of surfactant was increased to about 8 php, suggesting that a different chemical mechanism, besides that customarily associated with the use of surfactants as cell regulators, took over.

TABLE II

| Samples | 1 | 2 | 3 | 4 |
|---|---|---|---|---|
| Density (pcf) | | | | |
| overall | 1.96 | 1.85 | 1.83 | 1.97 |
| core | 1.66 | 1.66 | 1.70 | 1.89 |
| Compression @ yield-parr | 33.2 | 33.4 | 34.6 | 43.4 |
| Compression @ yield-perp | 14.0 | 13.6 | 11.9 | — |
| K-factor | | | | |
| initial | 0.147 | 0.144 | 0.143 | 0.146 |
| 10 days | 0.165 | 0.162 | 0.158 | 0.148 |
| 30 days | 0.177 | 0.174 | 0.173 | 0.159 |
| Butler Chimney % wt. retained | 78.0 | 80.5 | 76.7 | 86.2 |
| Porosity | 97.9 | 98.3 | 95.5 | 96.7 |
| Friability | 7.4 | 6.7 | 6.5 | 3.4 |

EXAMPLE 2

In this example, further studies were conducted to evaluate the performance of foams made with differing amounts of surfactant. The same procedure was used as described in Example 1 above. The amounts in parts by weight and the types of ingredients are reported in Table III below, along with the results of the foam evaluations. The foams were poured into molds and packed at 10% over theoretical.

TABLE III

| Sample | 1 | 2 | 3 | 4 |
|---|---|---|---|---|
| Polyol A | 85 | 85 | 0 | 0 |
| Polyol B | 15 | 15 | 15 | 15 |
| Polyol C | 0 | 0 | 85 | 85 |
| B-8462 | 2 | 8 | 2 | 8 |
| HexCem 977 | 3 | 3 | 3 | 3 |
| Polycat 5 | 0.3 | 0.3 | 0.3 | 0.3 |
| Water | 0.5 | 0.5 | 0.5 | 0.5 |
| 2-chloropropane | 7 | 7 | 7 | 7 |
| cyclopentane | 23 | 23 | 23 | 23 |
| total | 135.8 | 141.8 | 135.8 | 141.8 |
| Iso A | 200 | 200 | 207 | 207 |
| Index | 300 | 300 | 300 | 300 |
| Butler Chimney av. wt. ret. % | 85.4 | 90.11 | 85.66 | 89.08 |
| Butler Density (pcf) | 2.16 | 2.03 | 1.71 | 1.82 |

The results indicate again that foams made with 8 php of surfactant had better flame retardant properties over foams made with identical ingredients except with only the conventional 2 php surfactant. Even when the foams were manufactured with phosphite initiated polyols and 2-chloropropane, which together assist in retarding the flammability of polyurethane foams, the flammability was more improved when about 8 php of the oxyalkylene-silicone surfactant was used.

What we claim is:

1. A polyol composition comprising:
   a) a polyol having polyester linkages and a number average molecular weight of 400 or more; and
   b) at least about 8 php of a silicone-containing surfactant polymer.

2. The composition of claim 1, wherein the surfactant contains the moiety —Si(R$_2$)O—, where the R groups are independently an alkyl radical having 1 to 20 carbon atoms; an alicyclic, an aryl, an alkaryl or an aralkyl having 1 to 25 carbon atoms in the alkyl group; an aliphatic ether group; or a polyester group.

3. The composition of claim 2, wherein the R groups on the —Si(R$_2$)O—O moiety are independently alkyl radicals having from 1 to 4 carbon atoms silicone based surfactant polymer.

4. The composition of claim 1, wherein the surfactant is an oxyalkylene-silicone polymer terminated with hydrocarbon groups.

5. The composition of claim 4, wherein the surfactant corresponds to the general formula (II):

$$R'_3SiO(R_2SiO)_y[RO(C_nH_{2n}O)_zSiRO]_wSiR_3$$

wherein w is an integer of at least 1, y is an integer of at least 3 and stands for the number of difunctional siloxane units; z is an integer of at least 5 and stands for the length of a polyoxyalkylene chain; n is an integer of 2 to 4 and stands for the number of carbon atoms in an oxyalkylene group; R' is a monovalent hydrocarbon group; and each R group is independently an alkyl group or a trihydrocarbylsilyl group at an end of a siloxane group, and having a polysiloxane chain and a polyoxyalkylene chain bonded with a C—Si bond.

6. The composition of claim 5, wherein the surfactant corresponds to the formula:

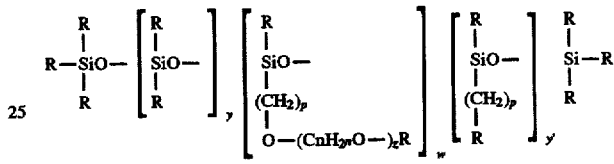

wherein w, y, z, n, and R are as defined in claim 5; y and y' together are as defined such that the sum of y and y' must be at least 3 and each are at least 1; and p is an integer from 2 to 17.

7. The composition of claim 5, wherein the surfactant is characterized by containing 5 to 95 percent by weight of polysiloxane units, and 95 to 5 percent by weight of polyoxyalkylene units, and having a molecular weight of 1,000 to 16,000.

8. The composition of claim 7, wherein R and R' are independently C$_1$–C$_6$ alkyl radicals, and wherein the surfactant has 5 to 50 weight percent polysiloxane units, and 95 to 50 percent by weight of polyoxyalkylene units.

9. The composition of claim 5, characterized by containing more than 95 percent by weight of polysiloxane units and less than 5 percent by weight of polyoxyalkylene units, and having a molecular weight of 500 to 10,000.

10. The composition of claim 1, wherein the surfactant comprises a hydroxyl functional polymer corresponding to the general formula:

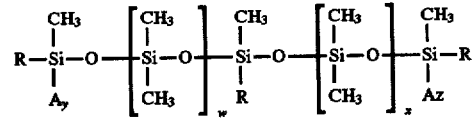

wherein
   each of R are independently an alkyl radical having 1 to 20 carbon atoms; an alicyclic, an aryl, an alkaryl or an aralkyl having 1 to 25 carbon atoms in the alkyl group; an aliphatic ether group; or a polyester group; and wherein a secondary hydroxyl functional group is substituted onto at least one of the R groups;
   each of A are independently one or more silicon atoms containing alkyl, alicyclic, cycloalkyl, aryl, alkyloxy, alkaryl, aralkyl, or arylalkoxy have a 1 to 25 carbon atoms in each aliphatic portion; an organosiloxane; hydrogen; or an alkyl having 1 to 25 carbon atoms;

the sum of w+x totals an integer which would correspond to an average hydroxyl equivalent weight ranging from 200 to 4,000.

11. The composition of claim 10, wherein each of R are independently an alkyl having from 1 to 10 carbon atoms, an alkoxy, or an ether having the formula:

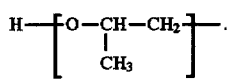

12. The composition of claim 11, wherein A is hydrogen, a $C_1$–$C_4$ alkyl, or a siloxane having the formula:

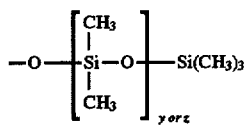

$R_2$ groups can have the same meaning as the $R_1$ groups, with the proviso that at least one $R_2$ group is a hydroxyl functional $C_1$–$C_8$ hydrocarbon or one or more oxyalkylene groups terminated with a hydroxyl group;

a has a value of 1 to 1000; and b has a value of 0 to 10.

14. The composition of claim 11, wherein the silicone polymer comprises a hydroxyl functional silicone polymer corresponding to the formula:

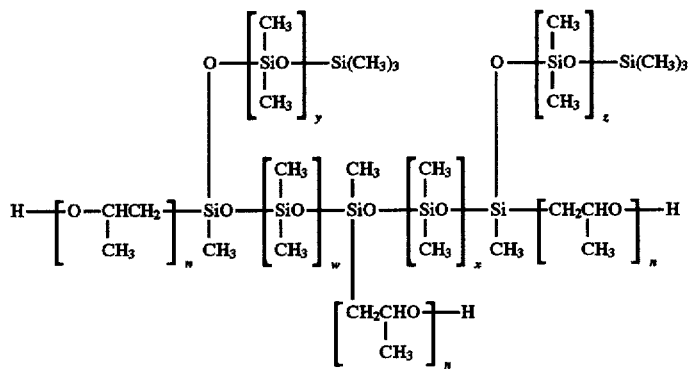

wherein each n is independently an integer ranging from 1 to 4, and w+x+y+z totals an integer corresponding to an average hydroxyl equivalent weight of the molecule ranging from 1,250 to 3,000.

15. The composition of claim 1, further comprising a blowing agent comprising an aliphatic or cycloaliphatic $C_4$–$C_7$ hydrocarbon.

16. The composition of claim 15, wherein the blowing agent comprises n-pentane, isopentane, cyclopentane, or mixtures thereof.

17. The composition of claim 15, further comprising water and 2-chloropropane.

18. The composition of claim 1, wherein the polyol comprises an aromatic polyester polyol.

19. The composition of claim 18, comprising a polyol derived from phthalic acid, terephthalic acid, isophthalic acid, dimethyl terephthalate, polyethylene terephthalate, or mixtures thereof.

20. The composition of claim 1, wherein a) comprises an aromatic polyester polyol, and further comprising an organo-phosphorous compound having at least two isocyanate reactive hydrogens.

21. The composition of claim 15, wherein the amount of all blowing agents is from 10 php to 40 php, and further comprising water in an amount 0.25 php to 1.0 php and a phosphite polyol.

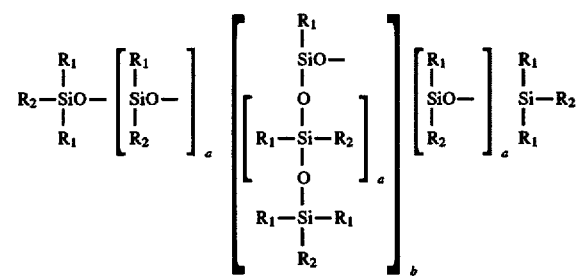

wherein n is an integer from 1 to 6, and w+x+y+z totals an integer corresponding to an average hydroxyl equivalent weight of the molecule ranging from 1,250 to 3,000.

13. The composition of claim 1, wherein the silicone polymer comprises a hydroxyl functional polymer represented by the formula:

wherein $R^1$ groups are the same or different and represent alkyl groups with 1 to 4 carbon atoms, phenyl groups, or groups with the formula:

* * * * *